Jan. 12, 1943.  H. M. DODGE ET AL  2,308,061
PLASTIC CUTTING APPARATUS
Filed May 31, 1940   2 Sheets-Sheet 2
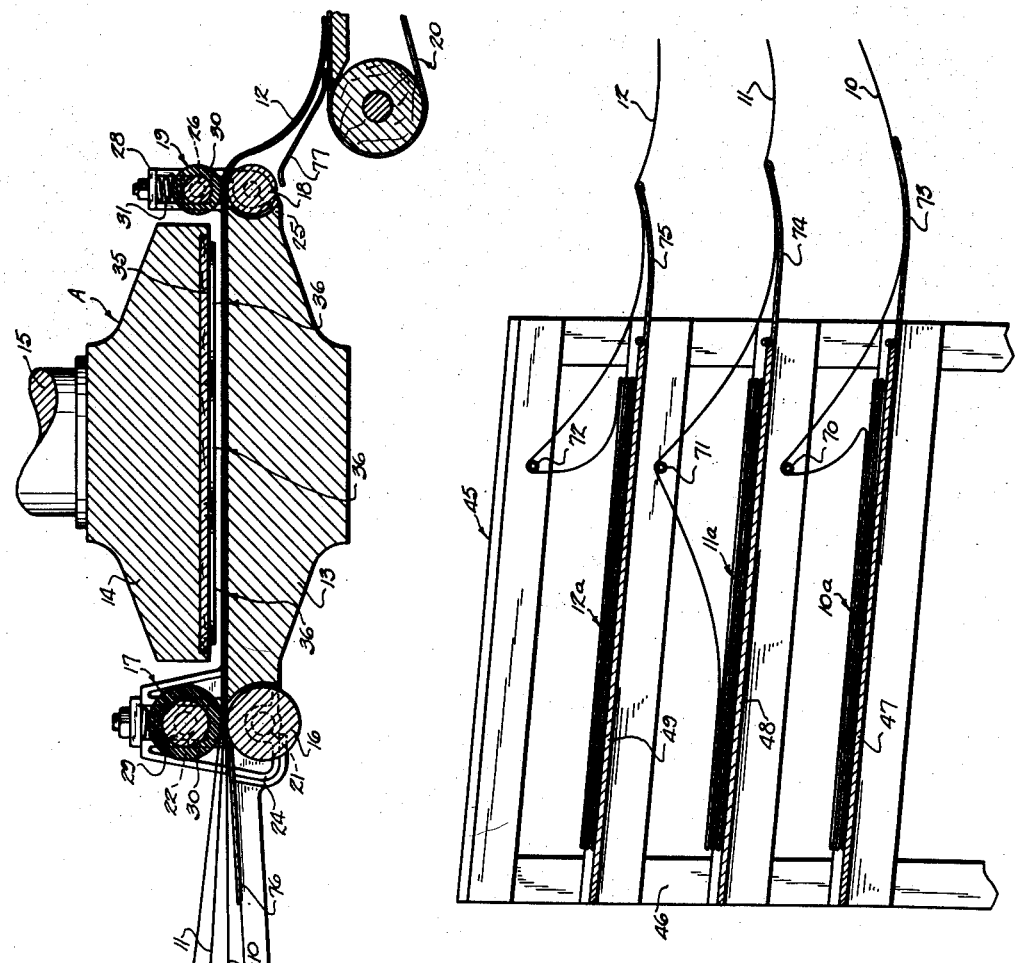
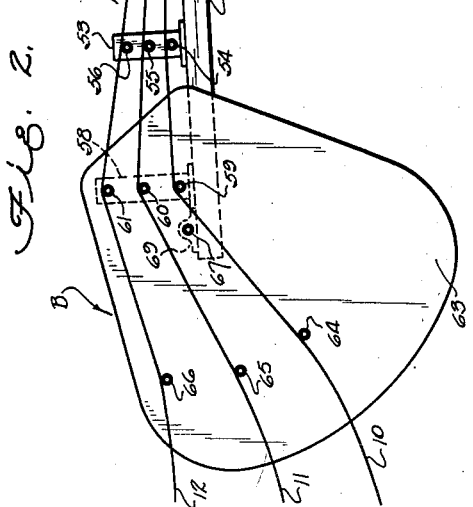
Inventors
HENRY M. DODGE.
WILLIAM K. DANIELLS.
By Frank Fraser
Attorney Patented Jan. 12, 1943

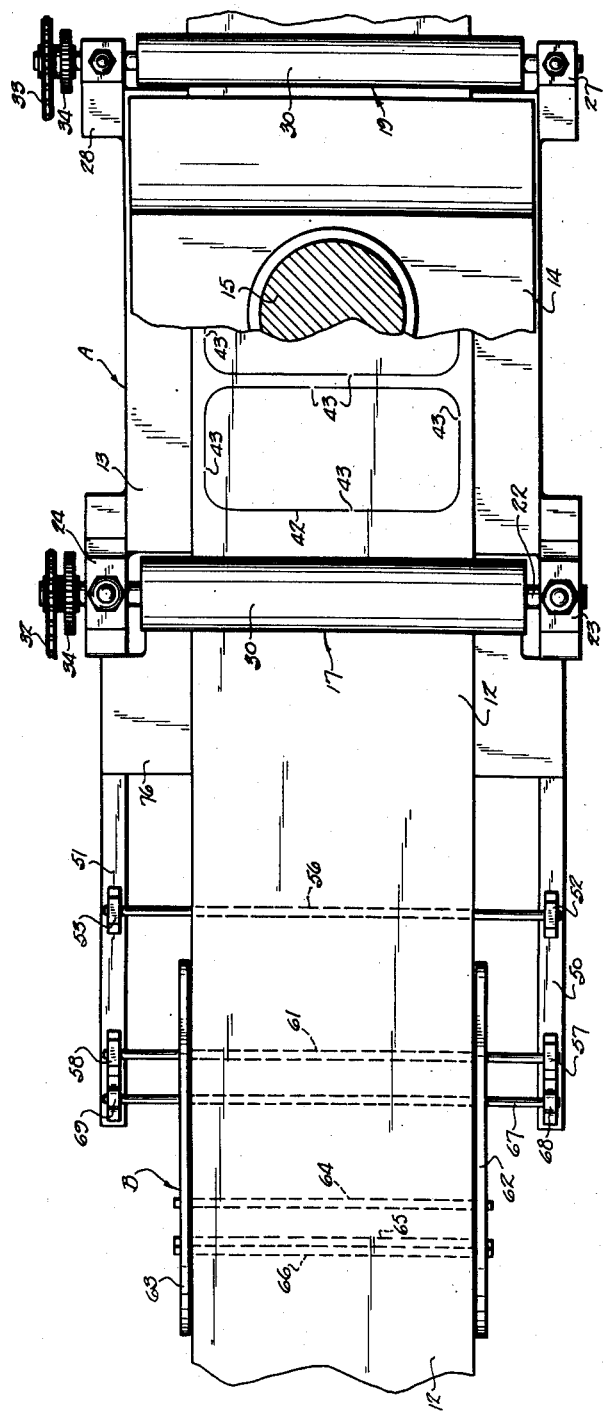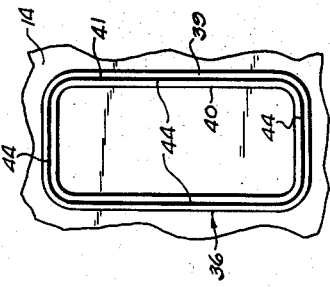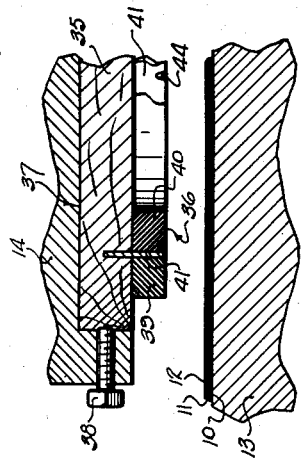

2,308,061

UNITED STATES PATENT OFFICE 2,308,061

PLASTIC CUTTING APPARATUS

Henry M. Dodge, Perrysburg, and William K. Daniells, Toledo, Ohio, assignors to Libbey-Owens-Ford Glass Company, Toledo, Ohio, a corporation of Ohio Application May 31, 1940, Serial No. 338,034

4 Claims. (Cl. 164—22)

The present invention relates to the art of cutting in general and more particularly to an apparatus and method for cutting sheet plastic such as is employed in the making of laminated safety glass.

In the manufacture of laminated safety glass, two sheets of glass and a sheet of transparent plastic material interposed therebetween are bonded together to form a composite structure. The plastic material preferably consists of a polyvinyl acetal resin such as Vinylite and the plastic is ordinarily received by the safety glass manufacturer in relatively large rolls upon which it is wound in the form of a continuous sheet or ribbon. When received by the safety glass manufacturer, the resin sheeting has a relatively greater moisture content than is desirable in the plastic when it is bonded with the glass sheets to form safety glass. In order to meet this difficulty, it has been proposed to condition the resin plastic whereby to reduce the moisture content thereof to the desired point before assembly with the glass sheets. After the plastic sheeting has been properly conditioned, it is ordinarily placed in a storage room having a predetermined temperature and humidity, and allowed to remain therein until it is ready for use, whereupon it is cut into individual sheets or sections of the desired shape and size and united with the glass sheets to form safety glass.

Although this invention is not limited to any particular method of or apparatus for conditioning and handling the plastic sheeting when received by the safety glass manufacturer, one such method and apparatus which may be employed in conjunction with the present invention is disclosed and claimed in the copending application of Carl B. Williams, Jr. filed April 29, 1940, Serial No. 332,409. As disclosed in said application, the plastic sheeting is passed through a drying oven to reduce the moisture content thereof to the desired point and, upon emerging from said oven, is laid in a multiplicity of loose, horizontal folds upon a suitable support. The plastic, thus folded, can then be stored until ready for use. The laying of the conditioned plastic sheeting horizontally in folds upon a support greatly facilitates the subsequent feeding of the plastic in the manner herein set forth and to the cutting apparatus provided, wherein it is cut to the shape and size of the glass sheets with which it is to be assembled.

An important object of the invention is the provision of an improved method of and means for feeding the plastic sheeting, laid in loose, horizontal folds, to the cutting apparatus in such a manner that stretching of the plastic sheeting is avoided.

Another important object of the invention is the provision of an improved method of and means for feeding a plurality of plastic sheets, superimposed one upon the other, to the cutting apparatus in such a manner that they may be simultaneously cut in a single cutting operation.

A further important object of the invention is the provision of an improved method of and apparatus for effecting the cutting of individual sheets or sections of predetermined shape and size from the plastic sheeting rapidly and accurately.

Other objects and advantages of the invention will become more apparent during the course of the following description when taken in connection with the accompanying drawings.

In the drawings wherein like numerals are employed to designate like parts throughout the same:

Fig. 1 is a plan view of plastic feeding and cutting apparatus constructed in accordance with the present invention;

Fig. 2 is a vertical longitudinal sectional view therethrough;

Fig. 3 is a vertical longitudinal sectional view through a rack for supporting the folded plastic sheets to be cut;

Fig. 4 is a detail vertical sectional view through one of the cutting dies; and

Fig. 5 is a bottom view of one of the cutting dies.

With reference now to the drawings, the letter A designates in its entirety the cutting apparatus, and B the means for feeding the plastic sheeting to be cut thereto. Although the feeding means B may be used to deliver only one sheet of plastic at a time to the cutting apparatus A, it is preferred that a plurality of sheets, superimposed one upon the other, be simultaneously fed thereto so that all of the sheets can be cut in a single cutting operation. Therefore, by way of example, three superimposed sheets of plastic 10, 11 and 12 are shown as being delivered to the cutting apparatus A by the feeding means B.

The cutting apparatus A comprises a press including the lower stationary platen 13 and the upper vertically movable platen 14 actuated by means of a plunger 15 or by any other suitable mechanism. If desired, the upper platen may be stationary and the lower platen movable relative thereto. Arranged at the forward end of the cutting press are the superimposed feed-in rolls 16 and 17 between which the plastic sheets 10, 11 and 12 pass to the cutting press, while mounted at the opposite end of said press are the take-out rolls 18 and 19 which receive the cut plastic sheets therebetween and deliver them upon an endless conveyor or the like 20.

The feed-in rolls 16 and 17 are carried by shafts 21 and 22 respectively journaled at their opposite ends in bearings mounted in bearing brackets 23 and 24 located at opposite sides of the cutting press and preferably carried by the lower platen 13. The take-out rolls 18 and 19 are mounted upon shafts 25 and 26 respectively journaled at their opposite ends in bearings mounted in bearing brackets 27 and 28 also preferably secured to the lower platen 13. Each lower roll 16 and 18 is preferably of metal while each upper roll 17 and 19 comprises a metal core 29 covered with a layer 30 of rubber, rubber composition, or other suitable yieldable compressible material. Each lower roll 16 and 18 is also mounted in fixed position while each upper roll 17 and 19 is preferably urged toward the respective lower roll by means of springs 31 carried by the corresponding bearing brackets. The sheets of plastic 10, 11 and 12 are adapted to be fed intermittently through the cutting press, and this may be accomplished by intermittently driving the rolls 16, 17 and 18, 19. To this end, there may be associated with the upper roll 17 a chain and sprocket drive or the like 32 and a similar drive 33 associated with upper roll 19. Each upper roll 17 and 19 has keyed thereto a gear 34 meshing with a similar gear carried by the shaft of the respective lower roll 16 or 18 to transmit rotary motion to said lower roll. The drives 32 and 33 may be suitably connected together so that the two pairs of rolls 16, 17 and 18, 19 are driven in properly timed relation.

Secured upon the underside of the upper platen 14 of the cutting press is a backing plate 35 preferably of wood and carrying one or a plurality of cutting dies 36. The backing plate 35 is preferably arranged within a recess 37 in the platen 14 and removably held therein by suitable set screws or the like 38. Each cutting die 36 comprises a pair of relatively narrow strips 39 and 40 of a compressible material, preferably soft rubber, arranged side by side closely adjacent one another to form a pattern of the desired shape and size. Disposed between the two rubber strips 39 and 40 is a cutting blade 41 consisting of a readily bendable steel strip bent to conform to the shape and size of the individual sheets or sections of plastic to be cut. The knife blade 41 is secured within the wooden backing plate 35 as clearly shown in Fig. 4, while the lower or cutting edge thereof terminates just slightly inwardly of the bottom faces of the rubber strips 39 and 40.

In the cutting operation, when the upper platen 14 of the press is lowered upon the plastic sheeting, the rubber strips 39 and 40 will be slightly compressed whereupon the cutting edge of the knife blade 41 will be projected beyond the rubber strips sufficiently to effect the severing of the plastic sheets along the lines of cut as indicated at 42 in Fig. 1. In Fig. 2, three cutting dies 36 are carried by the backing plate 35 and these cutting dies may be of the same or of different shapes and sizes as desired. According to the invention, the individual sheets or sections are not adapted to be completely severed from the plastic sheeting by the cutting dies 36 as this would interfere with the removal of the cut plastic from between the platens 13 and 14. On the contrary, the individual sheets or sections cut from the plastic sheeting are caused to remain connected therewith by relatively narrow uncut webs 43 (Fig. 1), and these can be formed by providing the cutting edges of the knife blade 41 with relatively small notches 44 (Fig. 5). In this way, the plastic sheeting can be continued through the press after being cut and the individual sheets or sections separated therefrom by the operator upon the conveyor 20 by simply breaking the webs 43.

As pointed out above, it is preferred that a plurality of plastic sheets 10, 11 and 12 be simultaneously fed to the cutting press so that they may be cut in a single cutting operation. Also, that in the above copending application of Carl B. Williams, Jr., the plastic sheeting, after being conditioned, is laid in a multiplicity of loose, horizontal folds upon a suitable support and then stored until ready for use. When it is desired to effect the cutting of the plastic, the thus folded plastic sheets are placed upon a rack such as shown in Fig. 3 and designated in its entirety by the numeral 45. This rack comprises a supporting framework 46 carrying the three preferably slightly inclined shelves 47, 48 and 49 upon which are placed the sheets of folded plastic 10a, 11a, and 12a, from which the sheets 10, 11 and 12 respectively are withdrawn.

The plastic feeding means B comprises a pair of substantially horizontal supporting members 50 and 51 extending forwardly from the cutting press A and upon which are carried, intermediate their ends, the uprights 52 and 53 carrying the superimposed transverse metal rods 54, 55 and 56 preferably of chrome plated steel or the like and over which the sheets of plastic 10, 11 and 12 respectively are passed. Also secured to the supporting members 50 and 51, adjacent the outer ends thereof, are similar uprights 57 and 58 carrying the metal rods 59, 60 and 61 preferably spaced apart a slightly greater distance than the rods 54, 55 and 56 and over which also pass the plastic sheets 10, 11 and 12 respectively. Mounted upon the rods 59, 60 and 61 are the spaced vertical guide plates 62 and 63 which carry, adjacent their outer ends, the horizontal metal rods 64, 65 and 66 for supporting the plastic sheets 10, 11 and 12 respectively as they are withdrawn from the rack 45 and which rods are spaced apart a relatively greater distance than the rods 59, 60 and 61. To assist in supporting the vertical guide plates 62 and 63 and prevent twisting of the rods 59, 60 and 61, there is passed through said guide plates a horizontal metal rod 67 supported at its opposite ends in bearings 68 and 69 secured to the horizontal supporting members 50 and 51 respectively.

The rack 45 for the sheets of folded plastic to be cut is preferably positioned relatively closely adjacent the feeding means B, and the plastic sheets 10, 11 and 12, after passing over rods 64, 65 and 66, are then passed over rods 59, 60 and 61 respectively, and thence over rods 54, 55 and 56 respectively. The three sheets of plastic are gradually drawn close together and passed between the feed-in rolls 16 and 17 through the press A and then between the take-out rolls 18 and 19 onto the endless conveyor 20. As the plastic sheets pass through the press, the upper platen 14 is periodically lowered so that the cutting dies 36 carried thereby effect the cutting out of individual sheets or sections of predetermined shape and size from the plastic sheeting. The individual sheets or sections are not completely separated from the plastic sheeting but instead are connected therewith by the narrow uncut webs 43 as explained above. During the cutting operation, the plastic is of course stationary, and this is accomplished by controlling the drive for the rolls 16, 17 and 18, 19.

Upon leaving the press, the cut plastic is received upon the endless conveyor 20 and the individual sheets or sections completely removed by breaking of the connecting webs 43 by an operator. The vertical guide plates 62 and 63 are adjustable along the rods 59, 60 and 61 so that they can be spaced apart a distance substantially equal to the width of the plastic sheeting. The supporting rack 45 for the folded plastic may be provided with horizontal guide rods 70, 71 and 72 over which the plastic sheets 10, 11 and 12 respectively are trained, said plastic sheets being also supported by the substantially horizontal, preferably metal plates 73, 74 and 75. A substantially horizontal guide plate 76 may be provided at the forward end of the cutting press while a guide plate 77 may be arranged at the opposite end of said press for guiding the plastic sheeting onto the endless conveyor 20. From the above, it will be seen that the plastic sheets 10, 11 and 12 are maintained spaced from one another until they pass between the feed-in rolls 16 and 17. Likewise, that the vertical guide plates 62 and 63 serve to prevent lateral shifting movement of the plastic sheets relative to one another during the feeding thereof to the press.

With the feeding means above described, the plastic sheeting can be fed to the cutting press in such a manner that stretching of the plastic is avoided. This is facilitated by the laying of the plastic sheeting in loose, horizontal folds upon the rack 45 and in then delivering the plastic from these folds to the press whereby a uniform feeding of the plastic can be obtained without stretching due to less weight of plastic or drag on the feeding means. Manifestly, if the plastic is stretched and then cut to the exact size desired while in a stretched condition, it will not be of the desired size when it returns to normal position after cutting. It might be suggested that this disadvantage could be overcome by cutting the plastic oversize, but such a practice would not be satisfactory as the stretching of the plastic would not always be uniform. By eliminating stretching of the plastic according to the present invention, it is possible to cut the plastic to the exact size desired.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. Apparatus for feeding a plurality of superimposed ribbons of plastic sheeting to a cutting machine, comprising means for separately supporting a plurality of ribbons arranged in a multiplicity of loose horizontal folds, a pair of rotatable feed rolls for withdrawing the ribbons simultaneously from said separate supporting means and delivering them to the cutting machine in disconnected superimposed relation, means interposed between said supporting means and feed rolls for directing the unfolding of said ribbons, and means for maintaining the same spaced from one another until they pass between the said rolls.

2. Apparatus for feeding a plurality of superimposed ribbons of plastic sheeting to a cutting machine, comprising means for separately supporting a plurality of ribbons arranged in a multiplicity of loose horizontal folds, a pair of rotatable feed rolls for withdrawing the ribbons simultaneously from said separate supporting means and delivering them to the cutting machine in disconnected superimposed relation, means interposed between said supporting means and feed rolls for directing the unfolding of said ribbons, means for maintaining the same spaced from one another until they pass between the said rolls, and means for preventing lateral shifting movement of the said sheets relative to one another during the passage thereof from said supporting means to said rolls.

3. Apparatus for feeding a plurality of superimposed ribbons of plastic sheeting to a cutting machine without stretching, comprising a rack for separately supporting a plurality of sheets arranged in a multiplicity of loose horizontal folds, a pair of rotatable feed rolls for withdrawing the ribbons simultaneously from said rack and delivering them to the cutting machine in disconnected superimposed relation, superimposed horizontal rods interposed between said rack and feed rolls for directing the unfolding of said ribbons, and means for maintaining the same spaced from one another until they pass between the said rolls.

4. Apparatus for feeding a plurality of superimposed ribbons of plastic sheeting to a cutting machine without stretching, comprising a rack for separately supporting a plurality of sheets arranged in a multiplicity of loose horizontal folds, a pair of rotatable feed rolls for withdrawing the ribbons simultaneously from said rack and delivering them to the cutting machine in disconnected superimposed relation, superimposed horizontal rods interposed between said rack and feed rolls for directing the unfolding of said ribbons, means for maintaining the same spaced from one another until they pass between the said rolls, and a pair of vertical guide plates for preventing lateral shifting movement of the said sheets relative to one another during the passage thereof from said rack to said rolls.

HENRY M. DODGE.
WILLIAM K. DANIELLS.

CERTIFICATE OF CORRECTION.

Patent No. 2,309,061. January 19, 1943.

WILLIAM F. GOFF.

It is hereby certified that error appears in the printed specification of the above numbered patent requiring correction as follows: Page 2, second column, line 33, before "similar" insert --27'--; same line, after "opening" second occurrence, for "27'" read --27--; and that the said Letters Patent should be read with this correction therein that the same may conform to the record of the case in the Patent Office.

Signed and sealed this 16th day of March, A. D. 1943.

(Seal)

Henry Van Arsdale,
Acting Commissioner of Patents.